April 23, 1946.  H. E. CARNAGUA  2,399,097
TRANSMISSION
Filed May 10, 1943  2 Sheets-Sheet 2
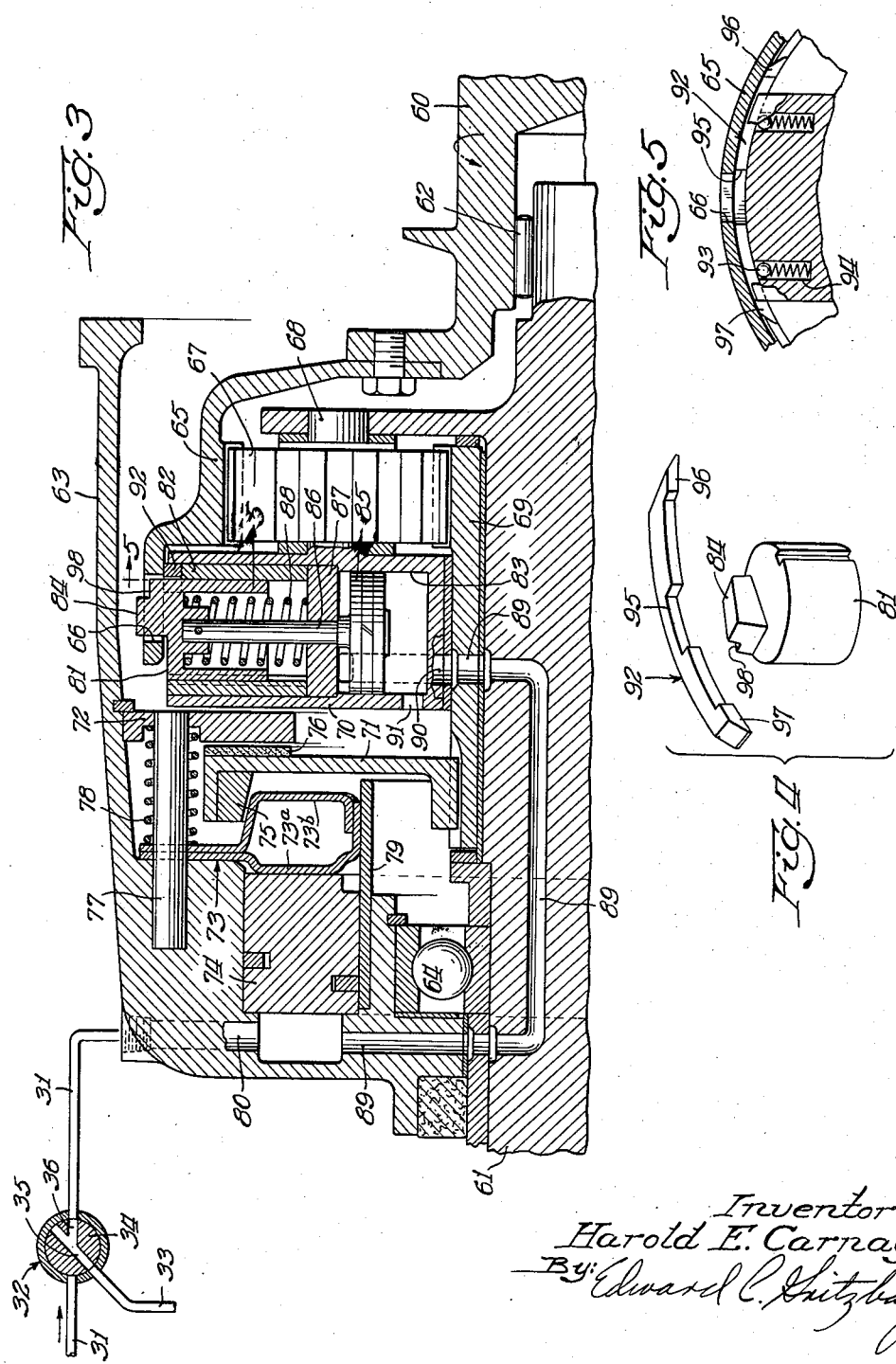
Inventor:
Harold E. Carnagua
By: Edward C. Fitzbaugh
Atty.

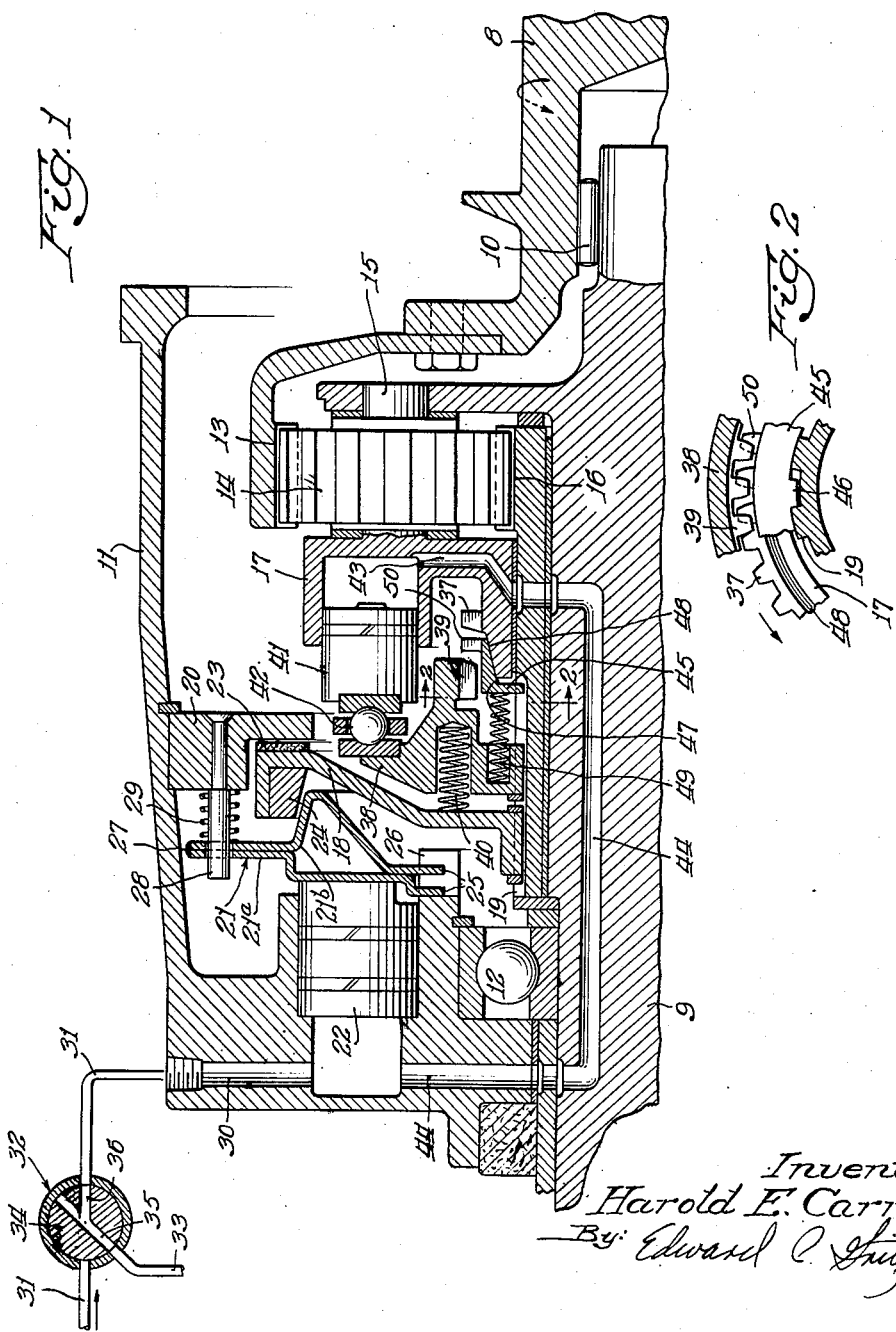

Patented Apr. 23, 1946

2,399,097

UNITED STATES PATENT OFFICE 2,399,097

TRANSMISSION

Harold E. Carnagua, Muncie, Ind., assignor to Borg-Warner Corporation, Chicago, Ill., a corporation of Illinois Application May 10, 1943, Serial No. 486,294

22 Claims. (Cl. 74—290)

My invention relates to transmissions and more specifically to transmissions which are particularly suitable for use in airplanes between the engines and propellers thereof.

In a copending application of William E. Moffitt, Serial No. 359,987, filed October 7, 1940, there is disclosed a two speed airplane transmission comprising planetary gearing, a dog slidably disposed in one of the elements of the gearing and adapted to enter an opening or window in another element of the gearing for locking up the gearing for direct drive, a fluid pressure operated piston in the stationary housing of the transmission and a bell crank carried by the element which also carries the dog and adapted to transmit force from the piston for disengaging the dog from the window.

It is an object of my invention to provide a transmission improved in design over the Moffitt transmission and including a positive coupling unit for locking together two movable elements of the transmission to provide direct drive and a fluid pressure responsive operator for actuating the coupling unit which instead of being mounted in the transmission housing is carried by one of the movable elements whereby no mechanical connections between a stationary piston and a movable element are necessary.

This and other objects of the invention will become apparent from the following detailed description when considered together with the accompanying drawings wherein:

Fig. 1 is a longitudinal sectional view of a transmission embodying the principles of my invention;

Fig. 2 is a sectional view taken on line 2—2 of Fig. 1;

Fig. 3 is a longitudinal sectional view of a modified form of transmission embodying the principles of my invention;

Fig. 4 is a perspective view of certain parts of the transmission shown in Fig. 3; and Fig. 5 is a sectional view taken on line 5—5 of Fig. 3.

Like characters of reference designate like parts in the several views.

Referring now particularly to Figs. 1 and 2 of the drawings, the illustrated transmission comprises a driving or input shaft 8 and a driven or output shaft 9 which is piloted with respect to the shaft 8 by means of a bearing 10. The shaft 9 is rotatably disposed with respect to a transmission housing 11 by means of a ball bearing 12 as shown. The driving shaft 8 has fixed thereto a ring gear 13 which is in mesh with a plurality of planet gears 14 (one being shown in the drawings). The planet gears 14 are each rotatably disposed on a stub shaft 15, and each of the shafts 15 is fixed with respect to the output shaft 9 by means of a suitable flange provided on the shaft 9, as shown. A toothed sun gear element 16 which is in mesh with each of the planet gears 14, is rotatably disposed on the shaft 9, and a carrier element 17 is rotatably disposed on the element 16. Each of the stub shafts 15 is fixed in the carrier element 17; and the driven shaft 9, the stub shafts 15 and the carrier element 17, therefore rotate in unison as a single part, as is apparent.

A fluid pressure operated brake is provided for arresting the rotation of the sun gear element 16. This brake comprises a brake disc 18 fixed on the sun gear element 16 by means of splines 19 on the latter element, an annular backing plate 20 fixed with respect to the housing 11 for the transmission, an annular pressure member 21, and a plurality of pistons 22 (one being shown in the drawings) slidably disposed in suitable cavities in the housing 11. The brake disc 18 is provided with an annular friction facing 23 on one side thereof which is adapted to cooperate with the plate member 20, and the brake disc 18 is provided with another friction facing 24 on its other side which is adapted to cooperate with the pressure member 21. The pressure member 21 is provided with internal lugs 25 (one being shown in the drawings), which are slidably disposed in suitable slots 26 formed in the housing 11, and member 21 is formed with perforated external lugs 27 (one being shown in the drawings) through the openings of which extend stub shafts 28 which are fixed to the plate member 20. The slots 26 and the shafts 28 function to hold the pressure member 21 against rotation but allow the member 21 to move longitudinally of the housing 11, and springs 29 are provided on the shafts 28 for yieldably holding the pressure member 21 at the limit of its movement to the left as seen in Fig. 1. The pressure member 21 is preferably formed by a pair of annular, stamped sheet metal members 21a and 21b which are fastened together by any suitable means, as by welding.

The housing 11 is formed with a passage 30 which is connected with the cavities in the housing for the pistons 22 and is also connected with a conduit 31. The conduit 31 is connected with any suitable source of fluid pressure and has a valve 32 disposed therein. The valve 32 is provided with a bleed or drain conduit 33 and comprises a movable portion 34 which has passages 35 and 36 formed therein.

The brake for the sun gear element 16 is inoperative when the valve portion 34 is in its position as shown in Fig. 1. With the valve portion 34 in this position, any fluid under pressure in the passage 30 may drain freely therefrom through the conduit 31, the passages 36 and 35 and in the valve portion 34 and through the conduit 33. With no fluid under pressure in the passage 30 and thereby also in the cavities for the piston 22, the springs 29 function to hold the pressure member 21 disengaged from the friction facing 24 and to hold the pistons 22 at the limits of their movement to the left as seen in Fig. 1, and the brake disc 18 is free to rotate.

When the valve portion 34 is rotated in a clockwise direction as seen in Fig. 1, to bring the passage 35 in alignment with the conduit 31, fluid under pressure is supplied through the conduit 31 and passage 30 to the cavities for the pistons 22, and the pistons and thereby the pressure member 21 are moved toward the right, as seen in the figure, against the action of the springs 29. On such movement of the member 21, it is brought into engagement with the friction facing 24, and the brake disc 18 is bent to a small extent to bring the friction facing 23 into contact with the backing member 20. The brake for the sun gear element 16 is thereby engaged, with the pressure member 21 pressing against the friction facing 24 and with the friction facing 23 pressing against the backing member 20, to arrest the rotation of the brake disc 18 and thereby of the sun gear element 16. When the valve portion 34 is thereafter rotated back to its position as shown in Fig. 1, fluid under pressure is drained from the cavities for the pistons 22, and the springs 29 function to bring the pistons 22 and the pressure member 21 and thereby also the brake disc 18 back to their positions as seen in the figure, and the brake for the sun gear element 16 is thus disengaged.

A positive type clutch is provided for locking together the carrier element 17 and the sun gear element 16 when the brake for the sun gear element is disengaged. This clutch comprises clutch teeth 37 formed on the carrier element 17 and a clutch member 38 formed with teeth 39 which member is slidably but non-rotatably disposed on the sun gear element 16 by means of the splines 19. The teeth 37 and 39 are adapted to interengage, and the member 38 is urged into position to interengage teeth 39 with teeth 37 by means of a spring 40 disposed between the member 38 and the brake disc 18.

Fluid pressure responsive means is provided for acting against the spring 40 to move the clutch member 38 to the left as seen in Fig. 1 for disengaging the teeth 39 from the teeth 37. The fluid pressure responsive means comprises a plurality of pistons 41 slidably disposed in suitable cavities in the carrier element 17 and a bearing 42 of the ball type provided between the pistons 41 and the clutch member 38. The cavities for the pistons 41 in the carrier element 17 are connected by passages 43 in the carrier element and a passage 44, extending through the sun gear element, the driven shaft 9 and the housing 11, with the cavities in the housing 11 for the pistons 22, and it will thus be apparent whenever fluid under pressure is applied to the pistons 22, fluid under pressure is simultaneously applied to the pistons 41. When the valve portion 34 is in its position as shown in the drawing, the passages 30, 44 and 43 will have been drained of fluid under pressure as is apparent, and the pistons 41, the bearing 42 and the clutch member 38 will have moved to positions to the right of their positions as shown in the drawing, their positions as shown in the drawing being those in which they are just prior to their movements by the spring 40 to the right for interengaging the teeth 39 and 37 after the valve portion is moved to its position as shown.

Blocking means is provided for prevent movement of the clutch member 38 to the right as seen in Fig. 1 and preventing an inter-engagement of the teeth 39 and 37 when there is relative rotation between the carrier element 17 and the clutch member 38, as when the brake for the sun gear is engaged and the shaft 9 is being driven at a reduced speed with respect to the shaft 8, as will be hereinafter described. The blocking means for the clutch member 38 comprises a blocker element 45 which is disposed on the sun gear element 16 between the carrier element 17 and the clutch member 38. The blocker element 45 is splined on the sun gear element 16 by means of teeth 46 provided on the blocker element which fit between the splines 19 on the sun gear element. The blocker element 45 is thus movable longitudinally with respect to the sun gear element 16, and since the teeth 46 are narrower in width than the spaces between the splines 19, as may be seen in the drawing, the blocker member 45 is also rotatable with respect to the sun gear element 16 for a limited distance as is apparent. The blocker element 45 is provided with a friction surface 47 which is adapted to cooperate with a friction surface 48 provided on the carrier element 17, and a spring 49 is provided between the blocker element 45 and the clutch member 38, which spring is of considerably less strength than the spring 40, for urging the blocker element to the right as seen in Fig. 1 whereby the friction surface 47 is held yieldingly in contact with the friction surface 48. The blocker element 45 is provided with teeth 50 which are disposed between the teeth 39 and 37, and act to block movement of the clutch member 38 to the right as seen in Fig. 1 and to prevent engagement of the teeth 39 and 37 as will now be described.

The teeth 50, when the blocker element 45 is in its position as shown in Fig. 2 relative to the sun gear element 16 and the splines 19, with the blocker element 45 rotated counterclockwise, as seen in Fig. 2, relative to the sun gear element 16 to the limit of its movement, function to block movement of the teeth 39 toward the right, as seen in Fig. 1, for inter-engagement of the teeth 39 with the teeth 37 as is apparent from an inspection of the figures. The teeth 50, when the blocker element 45 is rotated clockwise, as seen in Fig. 2, relative to the sun gear element 16 and the splines 19 to the limit of its movement with the sides of the teeth 46 which are shown in Fig. 2 as out of contact with the splines 19, allow the teeth 39 to pass through the teeth 50 and to mesh with the teeth 37 on movement of the clutch member 38 to the right as seen in Fig. 1. The friction surface 47 in contact with the friction surface 48 acts as means for rotating the blocker element 45 relative to sun gear element 16 between its position for blocking movement of the teeth 39 and its position for allowing engagement of the teeth 39 and 37. The surface 47 due to its frictional engagement with surface 48 functions to hold the blocker element in its Fig. 2 position when the carrier element 17 is rotating at a greater speed than the sun gear element 16 in a counterclockwise direction as seen in Fig. 2, and this condition is present when the brake for the sun gear element is engaged and the shaft 9 is driven at reduced speed through the planet gears 14, as will be hereinafter described. When the carrier element 17 stops such rotation with respect to sun gear element 16, under conditions hereinafter to be described, and rotates a small distance in the clockwise direction with respect to element 16 as seen in Fig. 2, blocker element 45 will be moved to its other position permitting the teeth 39 to pass between the teeth 50 and mesh with the teeth 37, due to the frictional contact between the friction surfaces 47 and 48, as is apparent.

The transmission illustrated in Figs. 1 and 2 provides two speed ratios, namely, an underdrive ratio when the brake for the sun gear element 16 is engaged and a direct drive ratio when the teeth 39 and 37 are engaged. When the valve portion 34 is rotated from its position as shown in Fig. 1 to bring the passage 35 into alignment with the conduit 31, fluid under pressure is applied to the pistons 22 through the passage 30 and fluid under pressure is applied to the pistons 41 through the passages 44 and 43. The pistons 22 are moved to the right as seen in Fig. 1 to engage pressure member 21 with the friction facing 24 and engage the friction facing 23 with the plate member 20. The brake for the sun gear element 16 is thus engaged, and the sun gear element is arrested from rotation. The pistons 41 are held by the fluid under pressure in their positions as shown in Fig. 1, and the pistons 41, by means of the bearing 42, act to hold the clutch member 38 against the action of the spring 40 in its position as shown in the figure with the teeth 39 and 37 disengaged. The drive through the transmission is then from the driving shaft 8, through the ring gear 13 and the planet gears 14 to the driven shaft 9, with the sun gear element 16 held stationary by its brake and acting as a fulcrum for torque multiplication. Since the sun gear element 16 is stationary, the speed of rotation of the shaft 9 is less than that of the shaft 8, and the shaft 9 is driven at an underdrive speed ratio.

When the valve portion 34 is thereafter rotated to its position as shown in Fig. 1 to drain the passages 30, 44 and 43 of fluid under pressure, the springs 29 act to move the pressure member 21 and the pistons 22 to their positions as shown in Fig. 1 and thereby disengage the brake for the sun gear element 16. The relief of fluid pressure on the pistons 41 allows the pistons, the bearing 42 and the clutch member 38 to be moved to the right as seen in Fig. 1 under the action of the spring 40. Full movement of the clutch member 38 to the right to inter-engage the teeth 39 and 37 is however prevented by the blocker element 45 until the blocker element is moved in a clockwise direction as seen in Fig. 2 relative to the sun gear element 16 whereby the teeth 50 allow the teeth 39 to pass therebetween. Such movement of the blocker element 45 occurs when the shafts 8 and 9 are brought into substantial synchronism by decreasing the speed of the shaft 8, and the shaft 9 rotates just a fraction of a revolution ahead of shaft 8 in the forward direction, whereby the carrier member 17 and the sun gear element 16, rotate at substantially the same speed and then the carrier element 17 rotates for a fraction of a revolution in a clockwise direction as seen in Fig. 2 relative to element 16 sufficient for moving the blocker element 45 to the limit of its movement in such direction with respect to element 16. The clutch member 38 then moves farther to the right as seen in Fig. 1, and the teeth 39 pass between the teeth 50 and inter-engage with teeth 37. The teeth 39 and 37 when inter-engaged lock the carrier member 17 and the sun gear element 16 together and thereby lock up the planetary unit whereby the shaft 8, the ring gear 13, the planet gears 14, the shafts 15 and the shaft 9 all rotate at the same speed. The transmission is then in direct drive.

When the valve portion 34 is thereafter moved to its position whereby the passage 35 is aligned with the conduit 31, fluid under pressure is then again applied to the pistons 22 and 41. The brake for the sun gear element 16 is thus engaged, and the clutch member 38 is moved to its position as shown in Fig. 1 and the teeth 39 and 37 are disengaged. The transmission then again drives the shaft 9 at the under drive ratio.

The modified form of my improved transmission shown in Figs. 3, 4 and 5 is similar in many respects to the transmission shown in Figs. 1 and 2. Both of the transmissions provide a direct drive and an underdrive speed, with the underdrive being obtained when a friction brake on the sun gear of a planetary gear set is engaged and with the direct drive being obtained when a positive type clutch is engaged to lock together two elements of the planetary gear set. The two embodiments of the invention are also similar in that in both a fluid pressure responsive piston is provided for operating the positive type clutch, and in both of the embodiments the operating piston is carried by the planet gear carrier. The principal difference between the two embodiments of the invention is that the positive type clutch in the Fig. 3 embodiment locks together the ring gear and planet gear carrier of the planetary unit of the transmission while in the Fig. 1 embodiment the positive type clutch locks together the planet gear carrier and the sun gear of the planetary unit of this transmission. The blocker for the positive clutch in the Fig. 3 embodiment also differs from the blocker for the positive clutch in the Fig. 1 embodiment due to the different forms of clutches provided.

The modified form of transmission shown in Fig. 3 comprises a driving or input shaft 60 and a driven or output shaft 61, with the driven shaft being piloted with respect to the driving shaft by means of roller bearings 62 and being rotatably mounted in the housing 63 for the transmission by means of a ball bearing unit 64. A ring gear element 65 having a plurality of windows or openings 66 formed therein (one being shown in the drawings) is fixed to the shaft 60. A plurality of planet gears 67 (one being shown in the drawings) are provided in mesh with the teeth of the element 65, and the gears 67 are rotatably mounted on stub shafts 68 which are fixed to the shaft 61 by means of a suitable flange portion provided on the shaft. A sun gear element 69 is rotatably mounted on the shaft 61 and is disposed with its teeth in mesh with the planet gears 67. A planet gear carrier portion 70 is rotatably disposed on the sun gear element 69 and is fixed with respect to the stub shafts 68, whereby the shaft 61, the shafts 68 and the carrier portion 70 rotate as a single piece.

A brake is provided for the sun gear element 69 and comprises a brake disc 71 splined on the element 69, a pressure plate 72 fixed with respect to the housing 63, an annular pressure member 73, and an annular piston 74 slidably disposed in a suitable cavity in the housing 63. The brake disc 71 is provided with friction facings 75 and 70 which are adapted to cooperate with the pressure member 73 and pressure plate 72 respectively. The pressure member 73 is preferably formed by a pair of annular stamped sheet metal members 73a and 73b which are fixed together by any suitable means as by welding. The pressure member 73 is provided with a plurality of perforations therein, and shafts 77 (one being shown in the drawings) are provided which extend through the openings in the pressure member and are fixed at opposite ends in the housing 63 and the pressure plate 72. The shafts 77 function, as is apparent, to hold the pressure member against rotation relative to the housing 63, and a spring 78 is provided on each of the shafts 77 to yieldingly hold the pressure member 73 at the limit of its movement to the left as seen in Fig. 3. A cylindrical member 79 is preferably provided fixed with respect to housing 63 and in contact with the pressure member 73 on its inner side, and the member 79 acts as a guide for the pressure member 73, as is apparent.

The cavity in the housing 63 for the piston 74 is connected with a passage 80 in the housing, and the passage 80 is connected with a source of fluid under pressure similar to that shown in Fig. 1 and comprising the conduit 31 and valve 32. When fluid under pressure is supplied to the passage 80 and thereby to the cavity for the piston 74, the piston, the pressure member 73 and the brake disc 71 are moved to the right as seen in Fig. 3 whereby the friction facings 75 and 76 respectively engage the pressure member 73 and the pressure plate 72, and the brake comprising the parts 72, 71 and 73 is thereby engaged to arrest rotation of the sun gear element 69.

The positive type clutch in the transmission which functions to lock together the ring gear element 65 and the planet carrier portion 70 comprises a plunger 81 slidably disposed in a sleeve 82 which is fixed in a cavity 83 in the planet gear carrier portion 70. The plunger 81 is formed on its outer end with a tooth 84 which is adapted to extend through any of the windows 66 in the ring gear member 65 whereby to engage the positive clutch. A piston 85 having a stem 86 is slidably disposed in the cavity 83, and the stem is fixed to the plunger 81 in any suitable means. A plate in the form of a disc 87 is fixed in the cavity 83 inwardly with respect to the sleeve 82, and the plate is provided with a central opening therein through which the stem 86 of the piston 85 extends. A compression spring 88 is provided between the plunger 81 and the disc 87, and the spring functions to yieldingly hold the plunger at the outward limit of its movement with its tooth 84 extending through any of the windows 66 in the ring gear element 65. A fluid conduit 89 is provided extending through the housing 63, the shaft 61 and the sun gear element 69, and the conduit is in communication with a fluid passage 90 formed in the carrier portion 70 and also with the passage 80. The conduit 90 opens into the cavity 83 at a place in the cavity just immediately inward of the plate 87 and between the plate and the piston 85, with the plunger 81 being in its outermost position with the tooth 84 extending through one of the windows 66. The conduits 89 and 90 function to supply fluid under pressure between the plate 87 and the piston 85 when the valve 32 is operated whereby fluid under pressure is supplied to the passage 80, and such an application of fluid under pressure between the parts 85 and 87 causes the piston 85 and thereby the plunger 81 to be moved inwardly against the action of the spring 88 to withdraw the tooth 84 from one of the windows 66 in which it was theretofore positioned. An opening 91 is preferably provided in the carrier portion 70 near the inner end of the cavity 83 whereby any fluid which may pass by the edges of the piston 85 may drain out of the cavity 83.

Means for blocking the movement of the plunger 81 outwardly to engage the tooth 84 in any of the windows 66 is provided. The blocking means comprises a blocker element 92 which is slidably disposed in a suitable channel formed in the carrier portion 70. The blocker element 92 is in frictional engagement with the ring gear element 65 and is yieldingly held in such engagement by means of balls 93 disposed in cavities in the carrier element 70 and exerting force on the blocker element 92 due to springs 94 in the cavities acting on the balls. The blocker element 92 is formed with a notch 95 and is provided with abutment portions 96 and 97 on its ends as shown.

When the blocker element 92 is positioned relative to the carrier portion 70 as shown in Figs. 3 and 5 with the notch 95 in alignment with tooth 84, the plunger 81 may be in its outermost position with the tooth 84 extending through the notch 95 and into one of the windows 66. In this position of the blocker element, the abutment 97 is in contact with the carrier portion 70 and as is apparent, such position of the blocker element may result from a rotation of the ring gear element 65 in a clockwise direction relative to the carrier portion 70, as seen in Fig. 5, due to the frictional contact between element 92 and the ring gear element 65. The tooth 84 is provided with a notch 98 and when the blocker element 92 is in such a position relative to the carrier portion 70 that the abutment 96 of the element 92 is in contact with the carrier portion 70, a part of the blocker element 92 to the right of the notch 95 as seen in Fig. 4 extends into the notch 98, and the plunger 81 is thereby held from outward movement from a position inward of its position as shown in Fig. 3, with the tooth 84 being inward of the ring gear element 65 and out of position for engaging with any of the windows 66. Such a position of the blocker element 92 relative to the carrier portion 70 may result, as is apparent, from a rotation of the ring gear element 65 in a counterclockwise direction relative to the carrier portion 70 as seen in Fig. 5, due to the frictional engagement of the blocker element and ring gear element, with, of course, the plunger 81 having been previously retracted by means of fluid pressure applied to the piston 85 to the position of the plunger wherein the tooth 84 is out of position for engaging any of the windows 66.

The transmission illustrated in Figs. 3 to 5 provides two speeds in forward drive, namely, an underdrive speed and a direct drive. When the parts of the transmission are in their positions as shown in Fig. 3, the conduit 31 is drained through the valve passages 36 and 35, and no fluid under pressure is applied to either the piston 74 or the piston 85. The brake for the sun gear element 69 is thus disengaged, and the spring 88 functions to hold the plunger 81 in its outermost position with the tooth 84 extending through one of the windows 66. The output shaft 61 is then driven in direct drive, and the drive is from the drive shaft 60 through the ring gear element 65 and the positive type clutch connecting the element 65 and the carrier portion 76 and including the tooth 84 and one of the windows 66, to the driven shaft 61.

When the valve portion 34 is thereafter moved so as to bring the passage 35 therein in alignment with the conduit 31, fluid under pressure is applied to the pistons 74 and 85 by means of the passages 80, 89 and 90. Such application of fluid pressure to the piston 74 causes movement of the pressure member 73 into engagement with the friction facing 75, and the brake for the sun gear element 69 is thus engaged. Such application of fluid pressure to the piston 85 causes movement of the piston and thereby the plunger 81 and tooth 84 inwardly to disengage the tooth from a window 66 in the ring gear element 65, and the positive clutch between the element 65 and carrier portion 70 is thus disengaged. The driven shaft 61 is then driven in underdrive speed, with the drive being from the drive shaft 60 through the ring gear element 65, the planet gears 67, and the stub shafts 68 to the shaft 61, with the sun gear element 69 functioning as the fulcrum for torque multiplication.

When the shaft 61 is thus driven in underdrive speed, the ring gear element 65 is rotating at a higher speed than the carrier portion 70, and due to the frictional engagement between the blocker element 92 and the ring gear element 65, the blocker element is positioned relative to the carrier element with the abutment portion 86 in engagement with the carrier portion and with part of the blocker element 92 in the notch 98. When the valve portion 34 is thereafter rotated to bring the passage 35 in alignment with the conduit 33 for changing the speed ratio of the transmission to direct drive, the brake for the sun gear element 69 is disengaged, but the positive type clutch between the ring gear element 65 and carrier portion 70 does not engage due to the blocker element 92 being positioned with its abutment 96 in contact with the carrier portion 70 and holding the plunger 81 from outward movement. In order to cause engagement of the positive clutch, the speed of the shaft 60 is decreased until the speed of the shaft 61 is equal to that of the shaft 60 and the shaft 61 rotates a fraction of a revolution in the forward direction ahead of the shaft 60. When the shaft 61 thus rotates ahead of the shaft 60, the blocker element 92 is moved relative to the carrier portion 70 such that the notch 95 moves into alignment with the tooth 84, and the spring 88 then acts to move the plunger 81 outwardly and engage the tooth 84 with one of the windows 66. The transmission then functions to drive the shaft 61 in direct drive.

In both the Fig. 1 embodiment of the invention and in the Fig. 3 embodiment of the invention, the fluid pressure responsive piston for the positive clutch, which clutch when engaged functions to provide a direct drive between the input and output shafts, is advantageously provided in the planet gear carrier. No mechanical connections between a stationary operator and a rotating element of a positive clutch thus need be provided.

I wish it to be understood that I do not intend to limit my invention to the details of construction shown and described except only insofar as certain of the claims may be specifically so limited, as it will be apparent to those skilled in the art that changes may be made in the constructions and arrangements without departing from the principles of the invention.

I claim:

1. In a transmission, the combination of a planetary gear set comprising a sun gear element, a ring gear element, a planet gear in mesh with the sun and ring gear elements, and a planet gear carrier element, a positive type clutch for locking together two of said elements, a fluid pressure responsive piston carried by one of said last named elements for disengaging said clutch, and a spring for urging said clutch into engagement.

2. In a transmission, the combination of a planetary gear set comprising a sun gear element, a ring gear element, a planet gear in mesh with the sun and ring gear elements, and a planet gear carrier element, a positive type clutch for locking together said carrier element with one of the other of said elements, means for preventing engagement of said clutch until said two last named elements are rotating at substantially the same speed, a fluid pressure operated piston carried by said carrier element for disengaging said clutch, and a spring for urging said clutch into engagement.

3. In a transmission, the combination of input and output shafts, a planetary gear set comprising a sun gear element, a ring gear element, planet gears in mesh with the sun and ring gear elements, and a planet gear carrier element, one of said shafts being connected with said ring gear element and the other of the shafts being connected with said carrier element, a positive type clutch for locking together two of said elements, a fluid pressure operated piston carried by one of said two last-named elements for disengaging said clutch, a brake for said sun gear element, a fluid pressure operated piston for engaging said brake, and fluid pressure means including a valve for applying fluid pressure simultaneously to both of said pistons.

4. In a transmission, the combination of input and output shafts, a planetary gear set comprising a sun gear element, a ring gear element, planet gears in mesh with the sun and ring gear elements, and a planet gear carrier element, one of said shafts being connected with said ring gear element and the other of said shafts being connected with said carrier element, a positive type clutch for locking together said carrier element and one of the other elements, means for preventing engagement of such clutch until said two last named elements are rotating at substantially the same speed, spring means for urging said clutch into engagement, a fluid pressure operated piston carried by said carrier element for disengaging said clutch, a brake for said sun gear element, a fluid pressure operated piston for engaging said brake, spring means for disengaging said brake, and fluid pressure means including a valve for applying fluid pressure simultaneously to both of said pistons.

5. In a transmission, the combination of a planetary gear set comprising a sun gear, a ring gear, a planet gear in mesh with the sun and ring gears, and a planet gear carrier, a positive type clutch for locking together said carrier and said sun gear, and including teeth on said carrier and a clutch member slidably and non-rotatably disposed with respect to said sun gear and having teeth adapted to mesh with said first named teeth, and a blocker element movable relative to said sun gear for blocking movement of said clutch member for engaging the teeth thereon with said first named teeth until the carrier and the sun gear are rotating at substantially the same speed.

6. In a transmission, the combination of a planetary gear set comprising a sun gear element, a ring gear, a planet gear in mesh with the sun gear element and ring gear, and a planet gear carrier element, a clutch for directly connecting and locking together said elements, wall means defining a chamber for carrying a piston, said chamber being carried by one of said two elements, and a fluid pressure responsive piston movable in said chamber for operating said clutch.

7. In a transmission, the combination of a planetary gear set comprising a sun gear, a ring gear, a planet gear in mesh with the sun and ring gears, and a planet gear carrier, a positive type clutch for locking together said carrier and said sun gear, wall means defining a chamber for carrying a piston, said chamber being carried by said carrier, and a fluid pressure responsive piston movable in said chamber for operating said clutch.

8. In a transmission, the combination of input and output shafts, a planetary gear set comprising a sun gear, a ring gear, a planet gear in mesh with the sun and ring gears, and a planet gear carrier, one of said shafts being connected with said ring gear and the other of the shafts being connected with said carrier, a positive type clutch for locking together said carrier and said sun gear, a fluid pressure operated piston carried by said carrier for disengaging said clutch, a brake for said sun gear, a fluid pressure operated piston for engaging said brake, and fluid pressure means including a valve for applying fluid pressure simultaneously to both of said pistons.

9. In a transmission, the combination of input and output shafts, a planetary gear set comprising a sun gear, a ring gear, a planet gear in mesh with the sun and ring gears, and a planet gear carrier, one of said shafts being connected with said ring gear and the other of the shafts being connected with said carrier, a positive type clutch for locking together said sun gear and carrier and including teeth on said carrier and a member slidably and non-rotatably disposed with respect to said sun gear and provided with teeth adapted to mesh with said first named teeth, a blocker element movable by said carrier with respect to said sun gear for preventing the meshing of said teeth until said carrier and sun gear are rotating at substantially the same speed, a fluid pressure operated piston carried by said carrier for disengaging said clutch, a brake for said sun gear, a fluid pressure operated piston for engaging said brake, and fluid means including a valve for applying fluid pressure simultaneously to both of said pistons.

10. In a transmission, the combination of a planetary gear set comprising a sun gear, a ring gear element, a planet gear in mesh with the ring gear element and sun gear, and a planet gear carrier element, a positive clutch for locking together said carrier element and said ring gear element, wall means defining a chamber for carrying a piston, said chamber being carried by one of said two elements, and a fluid pressure responsive piston movable in said chamber for operating said clutch.

11. In a transmission, the combination of a planetary gear set comprising a sun gear, a ring gear, a planet gear in mesh with the sun and ring gears, and a planet gear carrier, a positive type clutch for locking together said carrier and said ring gear, a fluid pressure responsive piston carried by said carrier for operating said clutch, and means for preventing engagement of said clutch until said ring gear and carrier are rotating at substantially the same speed.

12. In a transmission, the combination of a planetary gear set comprising a sun gear, a ring gear element, a planet gear in mesh with the sun gear and ring gear element, and a planet gear carrier, a positive type clutch for locking together said carrier and said ring gear element and including a plunger carried by said carrier, and adapted to engage in an opening provided in said ring gear element, a fluid pressure operated piston carried by said carrier for withdrawing said plunger from said opening, and spring means carried by said carrier for urging said plunger into engagement in said opening.

13. In a transmission, the combination of input and output shafts, a planetary gear set comprising a sun gear, a ring gear element, a planet gear in mesh with the sun gear and ring gear element, and a planet gear carrier, said ring gear element being connected with one of said shafts and said carrier being connected with the other of said shafts, a positive type clutch for locking together said carrier and said ring gear element and including a plunger carried by said carrier adapted to engage in an opening provided in said ring gear element, a fluid pressure operated piston carried by said carrier for moving said plunger with respect to said opening, a blocker element between said carrier and said ring gear element and adapted to be moved by said ring gear element with respect to said carrier whereby to prevent engagement of said plunger in said opening until the carrier and ring gear element are rotating at substantially the same speed, and a brake for said sun gear.

14. In a transmission, the combination of input and output shafts, a planetary gear set comprising a sun gear, a ring gear element, a planet gear in mesh with the sun and ring gear elements, and a planet gear carrier, said ring gear element being connected with one of said shafts and said carrier being connected with the other of said shafts, a positive type clutch for locking together said carrier and said ring gear element and including a plunger carried by said carrier adapted to enter an opening provided in said ring gear element, a fluid pressure operated piston carried by said carrier for withdrawing said plunger from said opening, a spring carried by said carrier for urging said plunger into engagement in said opening, a blocker element between said carrier and said ring gear element and adapted to be moved by the ring gear element relative to the carrier whereby to prevent engagement of said clutch until said carrier and said ring gear element are rotating at substantially the same speed, a brake for said sun gear, a fluid pressure operated piston for engaging said brake, and fluid pressure means including a valve for applying fluid pressure simultaneously to both of said pistons.

15. In a transmission, the combination of input and output shafts, a planetary gear set comprising a sun gear element, a ring gear element, planet gears in mesh with the sun and ring gear elements, and a planet gear carrier element, said input shaft being connected with one of said elements and said output shaft being connected with another of said elements, a positive type clutch for locking together two of said elements, a fluid pressure operated piston carried by one of said two of said elements for disengaging said clutch, and brake means for arresting the rotation of one of said elements for providing a speed changing drive through the transmission and including a fluid pressure operated piston for engaging said brake.

16. In a transmission, the combination of a planetary gear set comprising a sun gear element, a ring gear element, a planet gear in mesh with the sun and ring gear elements, and a planet gear carrier element, a positive type clutch for locking together two of said elements, means for preventing an engagement of said clutch unless said two last-named elements are rotating at substantially the same speed, wall means defining a chamber for carrying a piston, said chamber being carried by one of said two last-named elements, and a fluid pressure responsive piston movable in said chamber for operating said clutch.

17. In a transmission, the combination of a planetary gear set comprising a sun gear element, a ring gear element, a planet gear in mesh with the sun and ring gear elements, and a planet gear carrier element, a positive type clutch for locking together said carrier element and one of the other of said elements, wall means defining a chamber for carrying a piston, said chamber being carried by one of said two last-named elements, and a fluid pressure responsive piston movable in said chamber for operating said clutch.

18. In a transmission, the combination of a planetary gear set comprising a sun gear element, a ring gear element, a planet gear in mesh with the sun and ring gear elements, and a planet gear carrier element, a positive type clutch for locking together said carrier element and one of the other of said elements, a fluid pressure operated piston carried by said carrier element for disengaging said clutch, and a spring for urging said clutch into engagement.

19. In a transmission, the combination of input and output shafts, a planetary gear set comprising a sun gear element, a ring gear element, planet gears in mesh with the sun and ring gear elements, and a planet gear carrier element, said input shaft being connected with one of said elements, and said output shaft being connected with another of said elements, a positive type clutch for locking together two of said elements, wall means defining a chamber for carrying a piston, said chamber being carried by one of said two last-named elements, brake means for arresting the rotation of one of said elements, a fluid pressure operated piston movable in said chamber for disengaging said clutch, and a spring for urging said clutch into engagement.

20. In a transmission, the combination of input and output shafts, a planetary gear set comprising a sun gear element, a ring gear element, planet gears in mesh with the sun and ring gear elements, and a planet gear carrier element, one of said shafts being connected with said ring gear element and the other of said shafts being connected with said carrier element, a positive type clutch for locking together two of said elements, means for preventing engagement of said clutch until said two last-named elements are rotating at substantially the same speed, spring means for urging said clutch into engagement, a fluid pressure operated piston carried by said carrier element for disengaging said clutch, a brake for said sun gear element, a fluid pressure operated piston for engaging said brake, spring means for disengaging said brake, and fluid pressure means including a valve for applying fluid pressure simultaneously to both of said pistons.

21. In a transmission, the combination of input and output shafts, a planetary gear set comprising a sun gear, a ring gear, a planet gear in mesh with the sun and ring gears, and a planet gear carrier, one of said shafts being connected with said ring gear and the other of the shafts being connected with said carrier, a positive type clutch for locking together said carrier and sun gear, wall means defining a chamber for carrying a piston, said chamber being carried by said carrier, a fluid pressure responsive piston movable in said chamber for operating said clutch, means for preventing engagement of said clutch until said carrier and sun gear are rotating at substantially the same speed, and a brake for said sun gear.

22. In a transmission, the combination of a planetary gear set comprising a sun gear element, a ring gear element, a planet gear in mesh with the sun and ring gear elements, and a planet gear carrier element, a positive type clutch for locking together two of said elements, means for preventing engagement of said clutch until said two last-named elements are rotating at substantially the same speed, a fluid pressure operated piston carried by said carrier element for disengaging said clutch, and a spring for urging said clutch into engagement.

HAROLD E. CARNAGUA.